United States Patent [19]

Franchi

[11] Patent Number: 4,604,608
[45] Date of Patent: Aug. 5, 1986

[54] POSITIVE ACTION RELEASE MECHANISM

[75] Inventor: Ernest J. Franchi, Kwajalein, Mich.

[73] Assignee: The United States of America as represented by the Secretary of the Army, Washington, D.C.

[21] Appl. No.: 711,877

[22] Filed: Mar. 14, 1985

[51] Int. Cl.[4] .................. G08B 21/00; G01W 1/08
[52] U.S. Cl. ............................ 340/540; 73/170 R
[58] Field of Search ............. 340/540, 687; 116/106; 73/802, 855, 856, 170 R, 864.63, 864.65, 864.66, 864.67; 337/402, 411, 407, 405, 55, 154, 46; 220/89 B, 201, 375, 265; 169/57, 58, 26

[56] References Cited

U.S. PATENT DOCUMENTS

| | | | |
|---|---|---|---|
| 1,852,074 | 4/1932 | Carpenter et al. | 169/26 |
| 1,962,695 | 6/1934 | Pohl | 116/106 |
| 3,955,840 | 5/1976 | Rawls et al. | 292/201 X |
| 4,430,552 | 2/1984 | Peterson | 219/201 X |

OTHER PUBLICATIONS

*Meteorological Magazine*, No. 1184, 1971, pp. 82–83, Charnock et al., "A Pressure Actuated Release for Meteorological Balloons".

Primary Examiner—James L. Rowland
Assistant Examiner—Anne Marie F. Capati
Attorney, Agent, or Firm—Anthony T. Lane; Robert P, Gibson; Robert C. Sims

[57] ABSTRACT

A spring loaded lever is tied down by a resistor and released when an over supply of voltage is applied to the resistor from a command source. The lever can have a string attached to it such that it will open a container when the resistor breaks. Or the lever can have a weight on it which will break a rod which is being used to tie down a load. A rod can be a fuse such that when the fuse is broken an electrical signal can be generated to give an indication of the release.

3 Claims, 4 Drawing Figures

POSITIVE ACTION RELEASE MECHANISM

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

There is a need to develop a release mechanism to deploy objects from a balloon at high altitudes for the purpose of radar calibration measurements. These measurements require the objects to have no attached paraphernalia, such as, rope, string, glue etc. to alter the physical or electrical characteristics especially apparent with moisture and icing when tracked by radar. The device must be of low cost and capable of supporting a wide range of size and weight requirements of the objects to be released. In addition, it must operate reliable in harsh environments.

SUMMARY OF THE INVENTION

The present invention operates on the principle of storing the power of a spring loaded lever to perform a specific task when released on command. The lever is tied down by a resistor and released when power is applied to the resistor from the command source. Two versions of the release device are presently available.

Version #1—This version is capable of snapping open the lid of a plastic container and releasing its contents.

Version #2—With the addition of a solid brass rod 1" long, two mounting posts and a small glass rod, this version will be capable of releasing a fairly large object cradled in the mesh net. The net is tied down at two points, one being the glass rod. When the command is given, the glass rod will be destroyed by the weighted lever, releasing the contents of the net. The glass rod can be a fuse which will allow a transmitter to give an indication of release.

DESCRIPTION OF THE BEST MODE AND PREFERRED EMBODIMENTS

Figure 1:
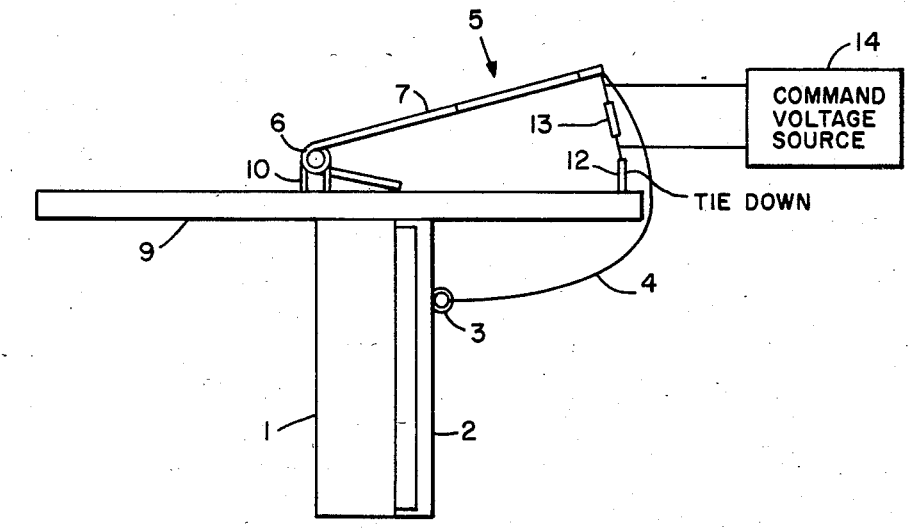
FIG. 1 is a diagrammatic showing of a first embodiment of the present invention.
Figure 2:
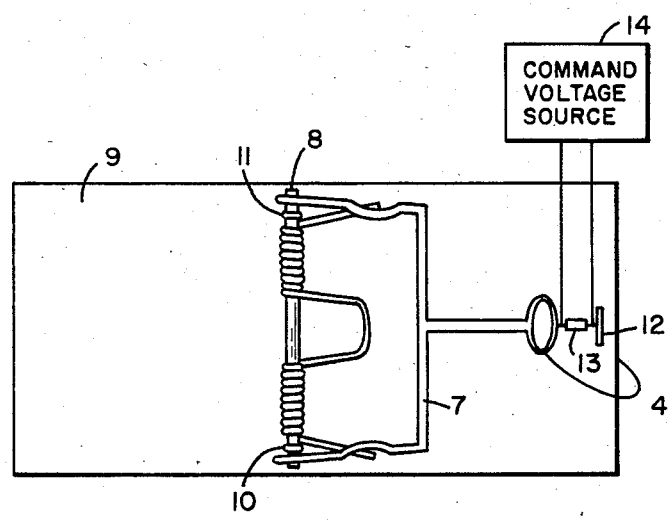
FIG. 2 is a top view of the first embodiment.

FIGS. 1 and 2 illustrate the release mechanism whereby container 1 having a cover 2 is opened by the release mechanism. The cover has a tie-down 3 in which a string 4 is attached.

Release mechanism is made of a spring loaded lever 5 having a spring 6 and a lever arm 7. The spring is wrapped about a rod 8 which is attached to the platform 9 by tie-downs 10 and 11. The platform is made of light weight materials such as wood, aluminum, or fiberglass. At one end of the platform a tie-down 12 is provided. A resistor 13 is to restrain lever arm 7 by attaching it to tie-down 12. The physical size of the resistor is determined by the amount of the spring tension the lever exerts on it in the armed position. The electrical characteristics depend upon the power source available. A command power source 14 is connected across resistor 13. When command power source 14 is activated, it will apply a voltage across resistor 13 which will over dissipate the resistor by at least 5 to 10 times the specific wattage rating of the resistor. Therefore the resistor will over heat and fatigue. At that point the resistor will fracture and allow the lever arm 7 to travel to the other end of the platform. The string 4 is attached to the lever arm 7 and will cause the cover 2 to open and release contents of container 1.

The command voltage source can be triggered locally (hard wired to a powered source), Barometrically by using a calibrated pressure sensitive bellows where altitude tolerances are not critical and may be remotely controlled by either radar or radio signals. The release mechanism is safe (no explosives) and ecologically clean.

Figure 3:
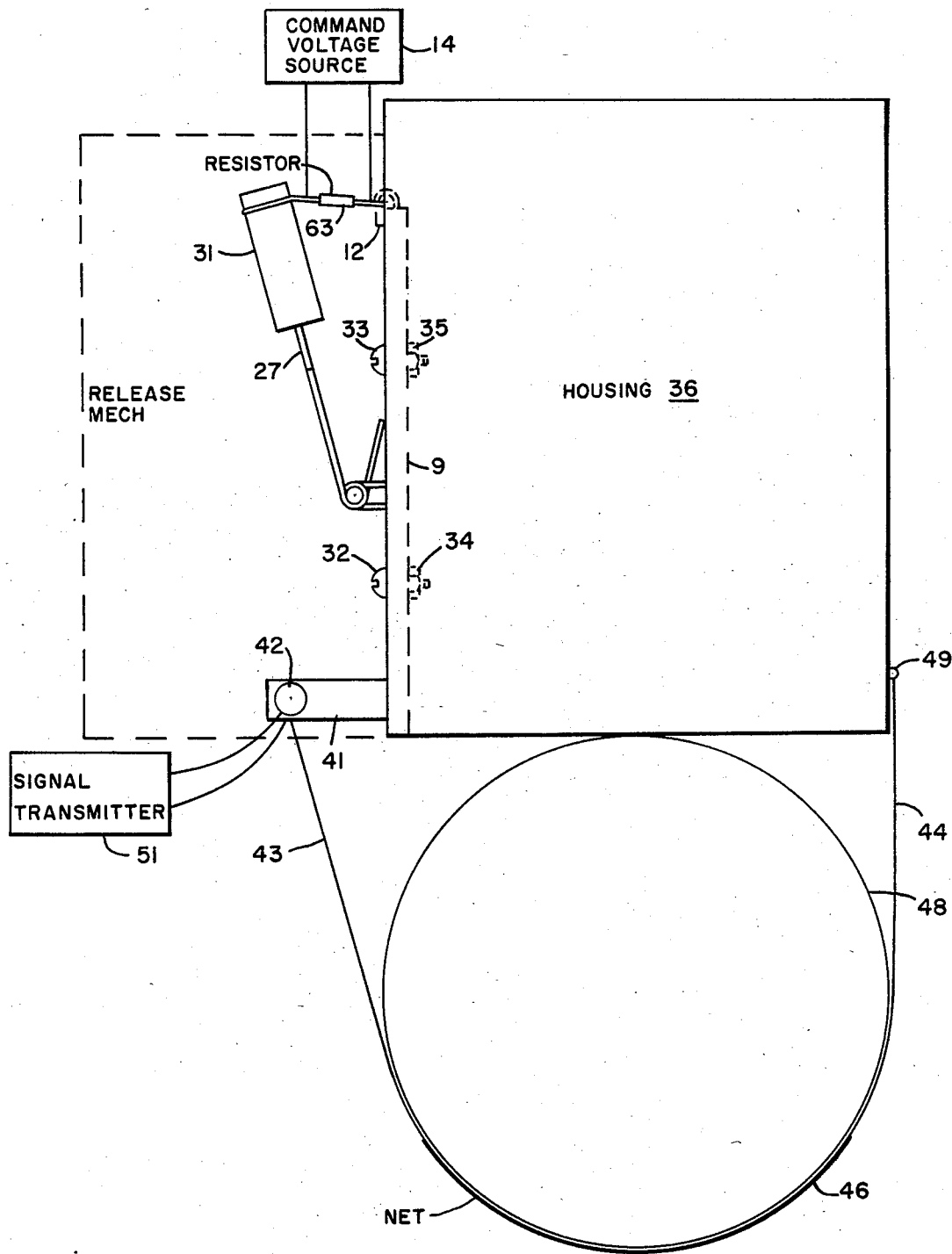
FIG. 3 is a diagrammatic showing of a second embodiment of the present invention.
Figure 4:
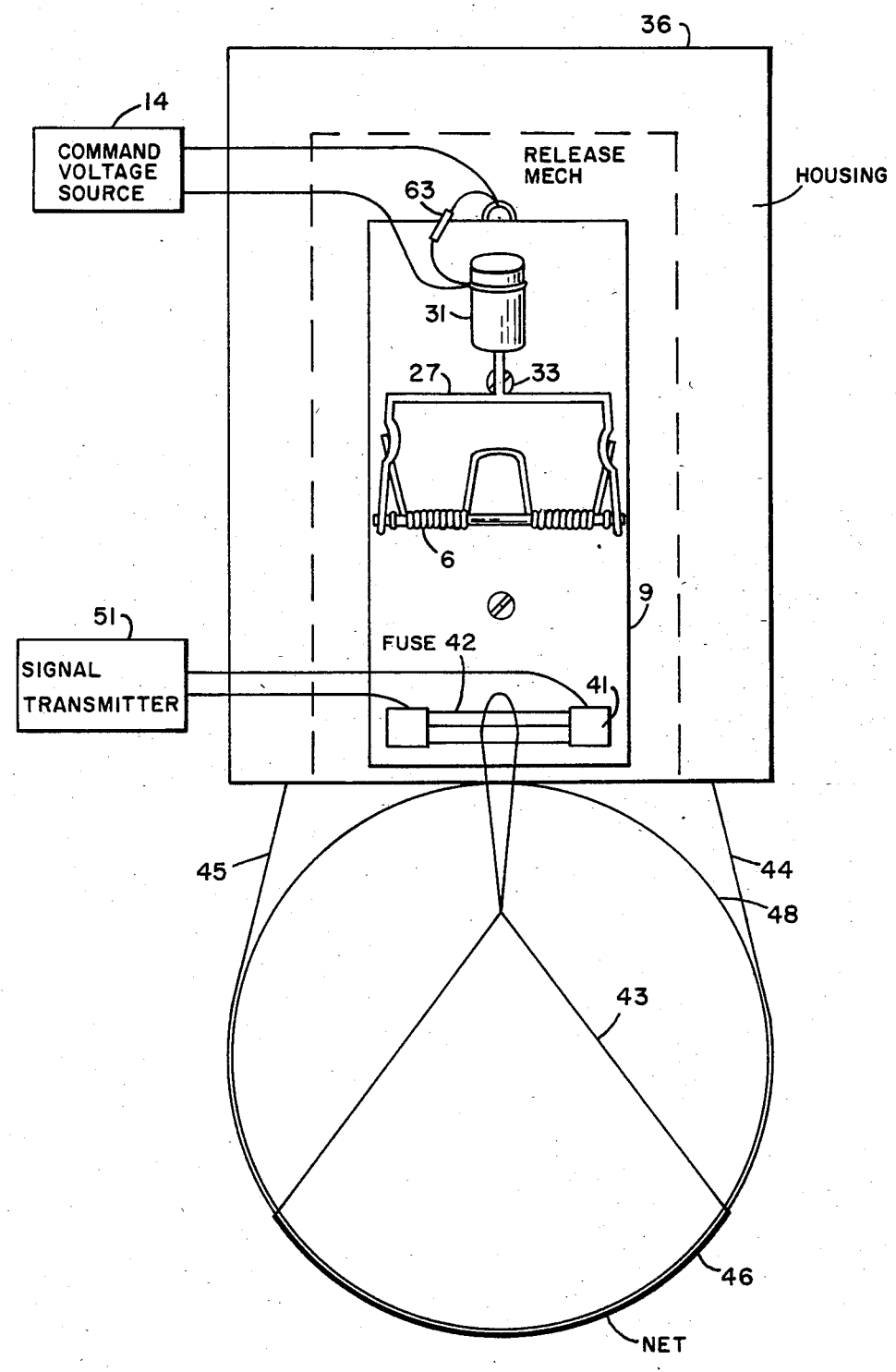
FIG. 4 is a top view of the second embodiment.

Embodiment shown in FIGS. 3 and 4 require additional components. A solid brass rod 31 is attached to lever arm 27 and uses the same tie-down and release system as set forth in FIGS. 1 and 2. Namely resistor 13 tie-down 12 and command voltage source 14. Mounting screws 32 and 33 along with nuts 34 and 35 are shown for attaching the platform 9 to a housing 36. A mount 41 is provided for holding a breakable rod such as a glass fuse 42. Strings 43 through 45 along with net 46 restrain a sphere 48. String 43 is attached to the glass rod 42 while strings 44 and 45 are attached to two tie-downs 49 (and one not shown).

When the command voltage source causes resistor 13 to break in two, the lever arm 27 will cause brass rod 31 to make contact with and shatter glass rod 42. This will cause string 43 to become free and allow sphere 48 to fall free from housing 36. This will of course release the sphere or other type of large objects restrained by the net into the atmosphere for observation. A signal transmitter 51 can be connected to fuse 42 so as to sense when the fuse has been broken. Transmitter 51 can relay this information so as to give a status signal and a positive indication of a successful or a faulty release.

The fuse is implemented as a hermetically sealed, normally closed, on-off switch. Upon impact of the weighted spring-loaded lever, the glass wll be shattered and the fuse element broken producing an open circuit. This will cause a switching action which will be suitable to generate an indication signal. The fuse is both electrically and mechanically sound in harsh environments in addition to simplifing construction as a common one-half amp, 3AG type glass fuse can be used.

I claim:

1. A system comprising a lever, biasing means connected to said lever so as to bias the lever to move in a predetermined direction, a platform positioned to hold said biasing means and said lever, an electrical element mechanically connected to said lever and to said platform so as to prevent said lever from moving in said predetermined direction, an electrical supply means connected across said electrical element such that when said electrical supply means is in an on condition, the electrical element will be caused to fracture and release said lever from movement in said predetermined direction, a breakable means connected to said platform, said breakable means being positioned such that when said lever is allowed to move in said predetermined direction said lever will make contact with said breakable means and cause breakable means to break, a load means which is desired to be released when said electrical supply means is in an on condition, said load means being tied down to said breakable means such that when said breakable means is broken said load means will be released, a signal generating means attached to said breakable means such that when said breakable means breaks said signal generating means will give an indication of that event, and said breakable means is a glass fuse mounted on said platform with electrical connections to said signal generating means.

2. A system as set forth in claim 1 further comprising a weight means attached to said lever so as to facilitate in the breaking of said breakable means.

3. A system as set forth in claim 2 wherein said electrical element is a resistor and said electrical supply means, when in the on condition will cause said resistor to overheat and fatigue therefore fracturing and releasing said lever.

* * * * *